(12) United States Patent
Okumoto (10) Patent No.: US 10,239,558 B2
(45) Date of Patent: Mar. 26, 2019

(54) VEHICLE LOWER SECTION STRUCTURE

(71) Applicant: Toyota Jidosha Kabushiki Kaisha, Toyota-shi, Aichi-ken (JP)

(72) Inventor: Ryuichi Okumoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/863,201

(22) Filed: Jan. 5, 2018

(65) Prior Publication Data

US 2018/0237071 A1 Aug. 23, 2018

(30) Foreign Application Priority Data

Feb. 20, 2017 (JP) .................................. 2017-028885

(51) Int. Cl.
| | | |
|---|---|---|
| B60G 3/20 | (2006.01) | |
| B62D 7/22 | (2006.01) | |
| B60G 15/00 | (2006.01) | |
| B62D 21/02 | (2006.01) | |
| B62D 21/11 | (2006.01) | |

(52) U.S. Cl.
CPC .............. *B62D 21/11* (2013.01); *B60G 3/20* (2013.01); *B62D 7/228* (2013.01); *B62D 21/02* (2013.01); *B60G 15/00* (2013.01); *B60G 2200/144* (2013.01)

(58) Field of Classification Search
CPC ........ B62D 21/11; B62D 7/228; B62D 21/02; B60G 3/20; B60G 2200/144; B60G 15/00
See application file for complete search history.

(56) References Cited

U.S. PATENT DOCUMENTS

| | | | | |
|---|---|---|---|---|
| 6,511,096 B1* | 1/2003 | Kunert | ..................... | B60G 7/02 |
| | | | | 280/124.109 |
| 9,956,992 B1* | 5/2018 | Iimi | ....................... | B62D 21/06 |
| 2009/0212548 A1* | 8/2009 | Frasch | .................. | B62D 21/11 |
| | | | | 280/785 |
| 2018/0265131 A1* | 9/2018 | Tanaka | ................... | B62D 21/11 |
| 2018/0265135 A1* | 9/2018 | Komiya | ................ | B62D 21/06 |
| 2018/0361481 A1* | 12/2018 | Tenhaeff | .................. | B22F 7/08 |

FOREIGN PATENT DOCUMENTS

| | | | |
|---|---|---|---|
| JP | H05310146 A | | 11/1993 |
| JP | H09226631 A | | 9/1997 |

* cited by examiner

*Primary Examiner* — Drew J Brown
(74) *Attorney, Agent, or Firm* — Dinsmore & Shohl LLP (57) ABSTRACT

A vehicle lower section structure including: a left and right pair of vehicle body frame members; a lower extension section joined to each of the left and right pair of vehicle body frame members, the lower extension section including: a front lower extension section extending toward a vehicle lower side, and a rear lower extension section disposed at a vehicle rear side of the front lower extension section and extending toward the vehicle lower side; and a front-rear direction extension section that bridges the vehicle front-rear direction between the front lower extension section and the rear lower extension section, the front-rear direction extension section provided with a lower arm support section that a lower arm is attached to pivotably substantially a vehicle vertical direction, and the front-rear direction extension section being joined to the rear lower extension section at the vehicle rear side of the lower arm support section.

9 Claims, 9 Drawing Sheets

VEHICLE LOWER SECTION STRUCTURE

CROSS-REFERENCE TO RELATED APPLICATION

This application claims priority under 35 USC 119 from Japanese Patent Application No. 2017-028885 filed Feb. 20, 2017, the disclosure of which is incorporated by reference herein in its entirety.

BACKGROUND

Technical Field

Embodiments of the present disclosure relate to a vehicle lower section structure.

Related Art

Japanese Patent Application Laid-Open (JP-A) No. H05-310146 describes a suspension attachment structure for a vehicle. The suspension attachment structure is provided with first brackets, second brackets, and third brackets that are respectively attached to a left and right pair of front side rails configuring part of vehicle body framework, and that are spaced apart from each other in a vehicle front-rear direction and that project toward the vehicle lower side. A suspension cross-member is attached to the first brackets and the second brackets. One end of lower arms of substantially bifurcated shape is attached to the suspension cross-member at positions aligned with the second brackets, namely, directly below the second brackets. Moreover, the other end of the lower arms is attached to the third brackets.

However, load input to the vehicle body framework from the lower arms during vehicle travel is input toward the vehicle rear side.

Thus, in cases in which the related technology described in JP-A No. H05-310146 is applied, it is difficult to efficiently transmit the load that has been input from the lower arms to the second brackets directly above the one end of the lower arms, and so it is possible that the load input from the lower arms may not be transmitted to the vehicle body framework efficiently. There is accordingly room for improvement on the related art in this respect.

SUMMARY

In consideration of the above circumstances, an object of present disclosure is to provide a vehicle lower section structure capable of efficiently transmitting load input from a lower arm to vehicle body framework.

A vehicle lower section structure of a first aspect of the disclosure includes; a left and right pair of vehicle body frame members extending substantially along a vehicle front-rear direction; a lower extension section that is joined to each of the left and right pair of vehicle body frame members; and a front-rear direction extension section. The lower extension section includes a front lower extension section disposed at a predetermined position in the vehicle front-rear direction with respect to the vehicle body frame members and extending toward a vehicle lower side, and a rear lower extension section disposed at a vehicle rear side of the front lower extension section and extending toward the vehicle lower side. The front-rear direction extension section is disposed so as to bridge along the vehicle front-rear direction between the front lower extension section and the rear lower extension section. The front-rear direction extension section is provided with a lower arm support section that a lower arm is configured to be attached to so as to be pivotable in substantially a vehicle vertical direction, and the front-rear direction extension section is joined to the rear lower extension section at the vehicle rear side of the lower arm support section.

According to the first aspect, the lower extension section is joined to each of the left and right pair of vehicle body frame members that extend in the vehicle front-rear direction. The lower extension section includes the front lower extension section disposed at the predetermined position in the vehicle front-rear direction with respect to the vehicle body frame members and extending toward the vehicle lower side, and the rear lower extension section disposed at a vehicle rear side of the front lower extension section and extending toward the vehicle lower side. Moreover, the front-rear direction extension section is provided so as to bridge along the vehicle front-rear direction between the front lower extension section and the rear lower extension section. The front-rear direction extension section is provided with the lower arm support section that the lower arm is configured to be pivotally attached to, and the front-rear direction extension section is joined to the rear lower extension section at the vehicle rear side or the lower arm support section. Load input from the lower arm during vehicle travel is mainly input toward the vehicle rear side. However, the load can be transmitted to the vehicle body frame member through the rear lower extension section positioned at the vehicle rear side with respect to the lower arm support section.

A vehicle lower section structure of a second aspect of the disclosure is the first aspect, wherein the rear lower extension section and the front-rear direction extension section are configured by discrete members.

According to the second aspect, due to the rear lower extension section and the front-rear direction extension section being configured by discrete members, an improvement can be achieved in handling during manufacture when attaching the front lower extension section, to which the front-rear direction extension section has been coupled, and the rear lower extension section to the vehicle body frame member.

A vehicle lower section structure of a third aspect of the disclosure is the second aspect, wherein at least one of a steering member or a stabilizer is configured to be disposed between the front lower extension section and the rear lower extension section.

According to the third aspect, at least one of the steering member or the stabilizer is provided between the front lower extension section and the rear lower extension section. An attachment operation when attaching the at least one of the steering, member or the stabilizer to the vehicle can be made easier by performing assembly to the vehicle prior to attaching the front lower extension section or the rear lower extension section to the vehicle body frame member.

A vehicle lower section structure of a fourth aspect of the disclosure is any one of the first aspect to the third aspect, wherein a bound stopper is provided at the rear lower extension section so as to be capable of contacting the lower arm when the lower arm has pivoted toward a vehicle upper side.

According to the fourth aspect, the bound stopper is provided at the rear lower extension section so as to be capable of contacting the lower arm when the lower arm has pivoted toward a vehicle upper side. Thus even in cases in which the lower arm has pivoted toward the vehicle upper side due to input from the road surface, additional movement of the lower arm is limited by the rear lower extension section, enabling impinging by the wheels or the like on the vehicle body to be reduced or prevented. Namely, movement of the lower arm can be limited by the rear lower extension section that configures part of members that attach the lower arm to the vehicle body.

A vehicle lower section structure of a fifth aspect of the disclosure is the fourth aspect, wherein; an inclined reinforcement section is formed at the rear lower extension section. The inclined reinforcement section is inclined toward a vehicle width direction inner side on progression toward the vehicle lower side and is joined to the front-rear direction extension section. The lower arm support section of the front-rear direction extension section is disposed at the vehicle lower side of a location where the inclined reinforcement section and the front-rear direction extension section are joined together.

According to the fifth aspect, the inclined reinforcement section is formed at the rear lower extension section, with the inclined reinforcement section being inclined toward the vehicle width direction inner side on progression toward the vehicle lower side. The inclined reinforcement section is joined to the front-rear direction extension section. The lower arm support section of the front-rear direction extension section is disposed at the vehicle lower side of the location where the inclined reinforcement section and the front-rear direction extension section are joined together. Namely, the lower arm support section is disposed at the vehicle width direction inner side of the vehicle body frame member. Thus the bound stopper of the rear lower extension section attached to the vehicle body frame member can be disposed at a position separated in the vehicle width direction from the lower arm support section, which is the center of pivot of the lower arm. Thus due to the principle of leverage, the load from the lower arm borne by the bound stopper, and hence, by the rear lower extension section, can thereby be made smaller than in a configuration in which the bound stopper is disposed in the vicinity of the lower arm support section, enabling the rear lower extension section to be made more compact.

A vehicle lower section structure of a sixth aspect of the disclosure is the fifth aspect wherein; the inclined reinforcement section includes a front face, a rear face facing the front face, and a collar provided between the front face and the rear face. The inclined reinforcement section is fastened to the front-rear direction extension section through a fastener that has been inserted through the front face, the rear face, and the collar.

According to the sixth aspect, the inclined reinforcement section includes the front face, the rear face facing the front face, and the collar provided between the front face and the rear face. The inclined reinforcement section is fastened to the front-rear direction extension section through the fastener that has been inserted through the front face, the rear face, and the collar. Thus at the time when load input from the lower arm is transmitted through the front-rear direction extension section to the rear lower extension section, the load can be transmitted to both the front face and the rear face by the collar, without being unevenly transmitted to either the front face or the rear face of the inclined reinforcement section in the rear lower extension section.

The vehicle lower section structure of a seventh aspect of the disclosure is the fifth aspect or the sixth aspect, wherein a contact reinforcement section that contacts a rear end portion of the front-rear direction extension section is attached to the inclined reinforcement section of the rear lower extension section. The contact reinforcement section is substantially plate-shaped with a plate thickness direction thereof being substantially along the vehicle front-rear direction and the contact reinforcement section is formed with a flange that extends along the plate thickness direction.

According to the seventh aspect, the contact reinforcement section that contacts the rear end portion of the front-rear direction extension section is attached to the inclined reinforcement section of the rear lower extension section. The flange is formed at the contact reinforcement section and the flange is substantially plate-shaped with its plate thickness direction substantially along the vehicle front-rear direction and extends along the plate thickness direction. The load input from the lower arm can be transmitted to the rear lower extension section through the front-rear direction extension section. When this occurs, the load can be transmitted to the rear lower extension section through the contact reinforcement section, that has improved bending rigidity caused by the flange, and is further transmitted efficiently to the vehicle body frame member.

A vehicle lower section structure of an eighth aspect of the disclosure is any one of the first aspect to the seventh aspect, wherein an inclined portion is formed at a vehicle front side face of the front lower extension section, the inclined portion being inclined toward the vehicle rear side on progression toward the vehicle lower side.

According to the eighth aspect, the inclined portion is formed at the vehicle front side face of the front lower extension section, and the inclined portion is inclined toward the vehicle rear side on progression toward the vehicle lower side. Thus, when an obstacle such as a rock hits the front lower extension section during vehicle travel, the obstacle is more readily allowed to escape toward the vehicle rear side by the inclined portion, enabling the impact force input to the front lower extension section to be reduced.

A vehicle lower section structure of a ninth aspect of the disclosure is any one of the first aspect to the eighth aspect, wherein the front lower extension section is respectively provided at the left and right pair of vehicle body frame members, and the front lower extension sections are linked together to each other in the vehicle width direction so as to form an integral body.

According to the ninth aspect, the front lower extension section is provided at the left and right pair of vehicle body frame members, and the front lower extension section links the left and right pair of vehicle body frame members together in the vehicle width direction so as to form a single body. Namely, the front lower extension section is configured so as to readily distribute load on the rear lower extension section. Thus deformation and damage can be suppressed even in cases in which an obstacle hits the front lower extension section during vehicle travel.

The vehicle lower section structure of the first aspect of the disclosure exhibits the excellent advantageous effect of enabling efficient transmission of load input from the lower arm to the vehicle body framework.

The vehicle lower section structure of the second aspect of the disclosure exhibits the excellent advantageous effect of enabling the ease of production to be improved during manufacture.

The vehicle lower section structure of the third aspect of the disclosure exhibits the excellent advantageous effect of enabling the ease of production to be improved during manufacture.

The vehicle lower section structure of the fourth aspect of the disclosure exhibits the excellent advantageous effect of enabling the number of components to be reduced.

The vehicle lower section structure of the fifth aspect of the disclosure exhibits the excellent advantageous effect of enabling a reduction in weight of the vehicle to be achieved.

The vehicle lower section structure of the sixth aspect and the seventh aspect of the disclosure exhibit the excellent advantageous effect of enabling efficient transmission of load input from the lower arm to the vehicle body framework.

The vehicle lower section structure of the eighth aspect and the ninth aspect of the disclosure exhibit the excellent advantageous effect of enabling damage to the vehicle to be reduced when traveling on a rough road or the like.

BRIEF DESCRIPTION OF THE DRAWINGS

Embodiments of the present disclosure will be described in detail based on the following figures, wherein.

DETAILED DESCRIPTION

An exemplary embodiment of the present disclosures will now be described, with reference to FIG. 1 to FIG. 8. Note that in these figures the arrow FR indicates the front side in a vehicle front-rear direction, the arrow OUT indicates the outside in a vehicle width direction, and the arrow UP indicates the upper side in a vehicle vertical direction.

Figure 1:
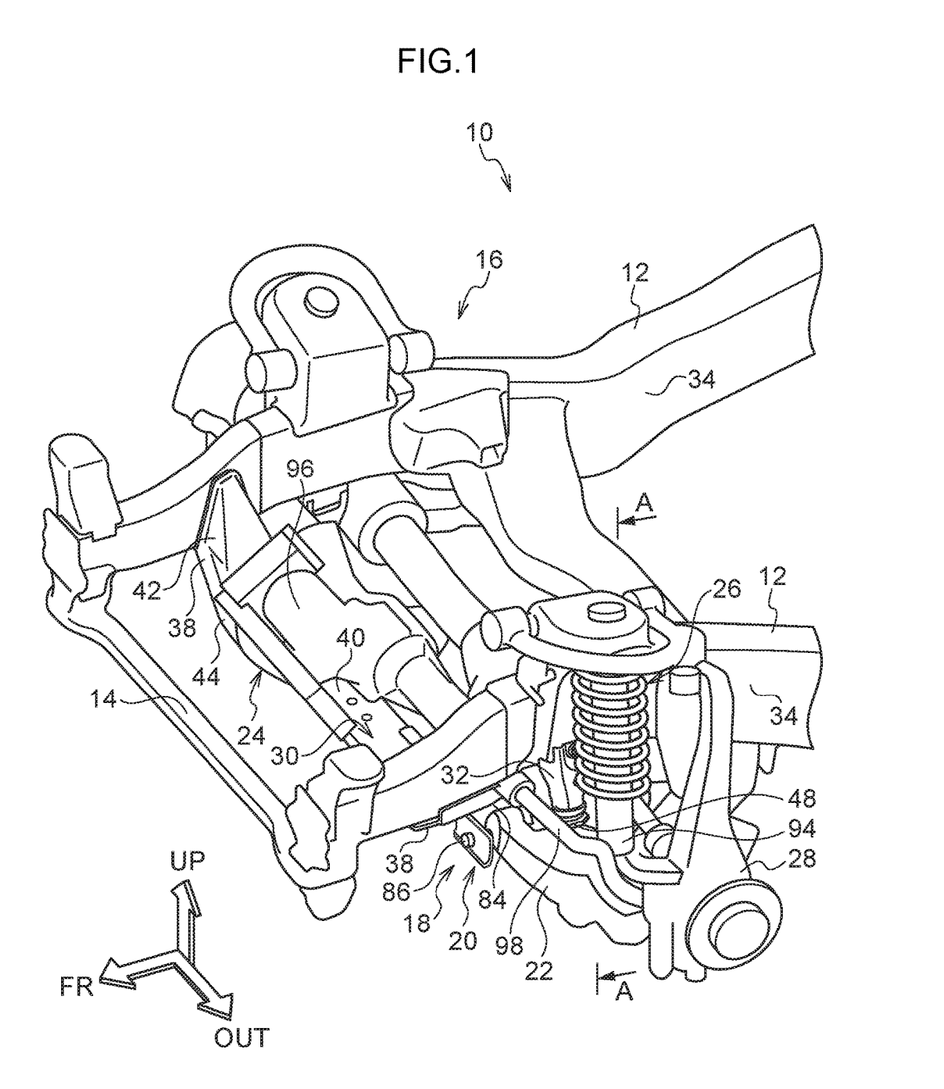
FIG. 1 is a perspective view illustrating part of a vehicle body front section including a vehicle lower section structure according to an exemplary embodiment, as illustrated in a state viewed from the vehicle front side toward the vehicle rear side.

As illustrated in FIG. 1, in a lower section of a vehicle 10 having, for example, a ladder frame structure, a left and right pair of side rails 12 are provided to serve as vehicle body frame members that configure part of vehicle body framework and extend substantially along the vehicle front-roar direction, The side rails 12 are formed with substantially rectangular shapes in cross-section profile orthogonal to their length directions, with the length direction of the rectangular shape along the vehicle vertical direction. The front ends of the left and right pair of side rails 12 are linked together along the vehicle width direction by a linking member 14.

A front wheel suspension device 16 is attached to the side rails 12. The front wheel suspension device 16 includes a lower extension section 18, lower arm brackets 20 (see FIG. 2) serving as front-rear direction extension sections, lower arms 22, a steering gear box 24 serving as a steering member, font suspensions 26, and steering knuckles 28.

Figure 2:
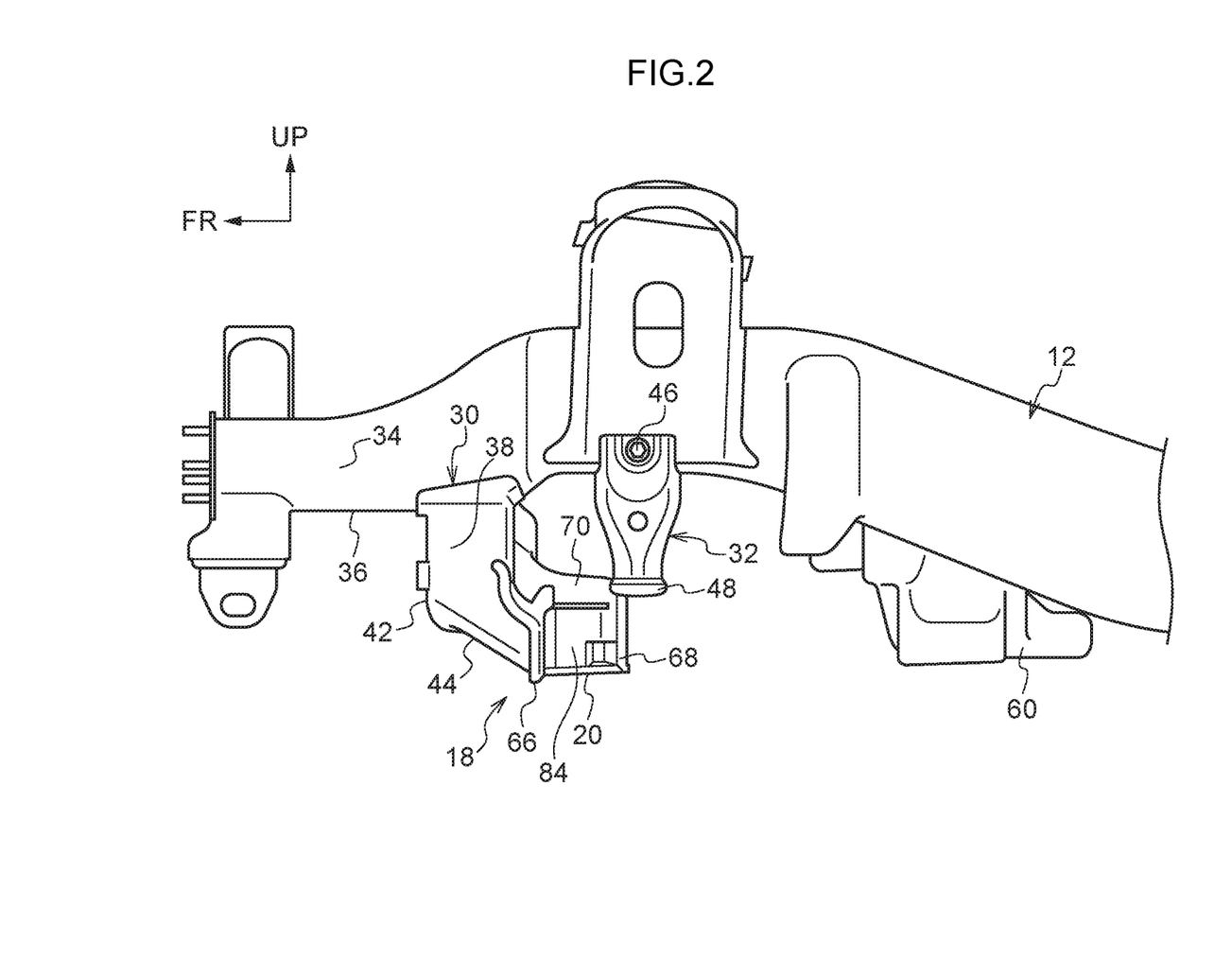
FIG. 2 is a side view illustrating relevant portions of a vehicle lower section structure according to an exemplary embodiment.

As illustrated in FIG. 2, the lower extension section 18 is configured including cross-members 30 serving as a front lower extension section, and front-bound stopper brackets (referred to below as "bound stopper brackets") 32 serving as rear lower extension sections. The cross-members 30 include extension portions 38 that are each coupled to a pair of side wails 34 and, a bottom wall 36 of each of the side rails 12, and that extend toward a vehicle lower side, and a linking portion 40 that links a left and right pair of the extension portions 38 together along the vehicle width direction so as to form a single body (see FIG. 3 and FIG. 4). Note that an inclined portion 44 is formed at a vehicle front face 42 of each of the extension portions 38 of the cross-members 30, with the inclined portion 44 being inclined toward a vehicle rear side on progression toward a vehicle lower side.

The bound stopper brackets 32 are disposed at vehicle rear sided of the cross-members 30. The bound stopper brackets 32 are formed in a substantially polygonal column shape extending toward a vehicle lower side, and are each fastened to the pair of side walls 34 and the bottom wall 36 of the left or right pair of side rails 12 through fasteners 46 (also see FIG. 8A). Bound stoppers 48 are provided at lower ends of the bound stopper brackets 32, namely, at the bound stopper brackets 32 at a vehicle lower side of the side rails 12. The bound stoppers 48 are capable of making contact with the lower arms 22 (see FIG. 1) when the lower arms 22 have moved toward a vehicle upper side. The bound stoppers 48 are, for example, formed by members having elasticity, and are configured to cushion impact force when the lower arms 22 make contact with the bound stoppers 48.

Figure 6:
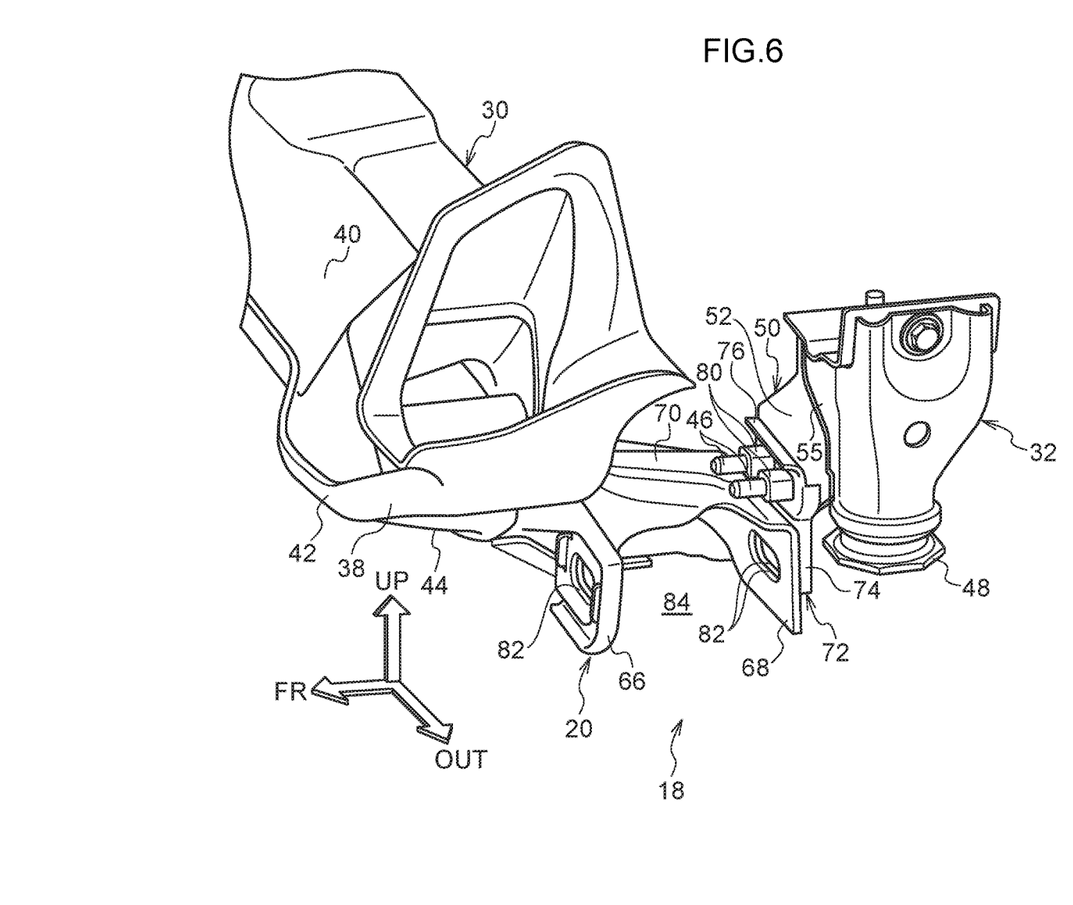
FIG. 6 is a perspective view illustrating a front lower extension section, a rear lower extension section, and a front-rear direction extension section in a vehicle lower section structure according to an exemplary embodiment, as illustrated in a state viewed from the vehicle front side toward the vehicle rear side.
Figure 7:
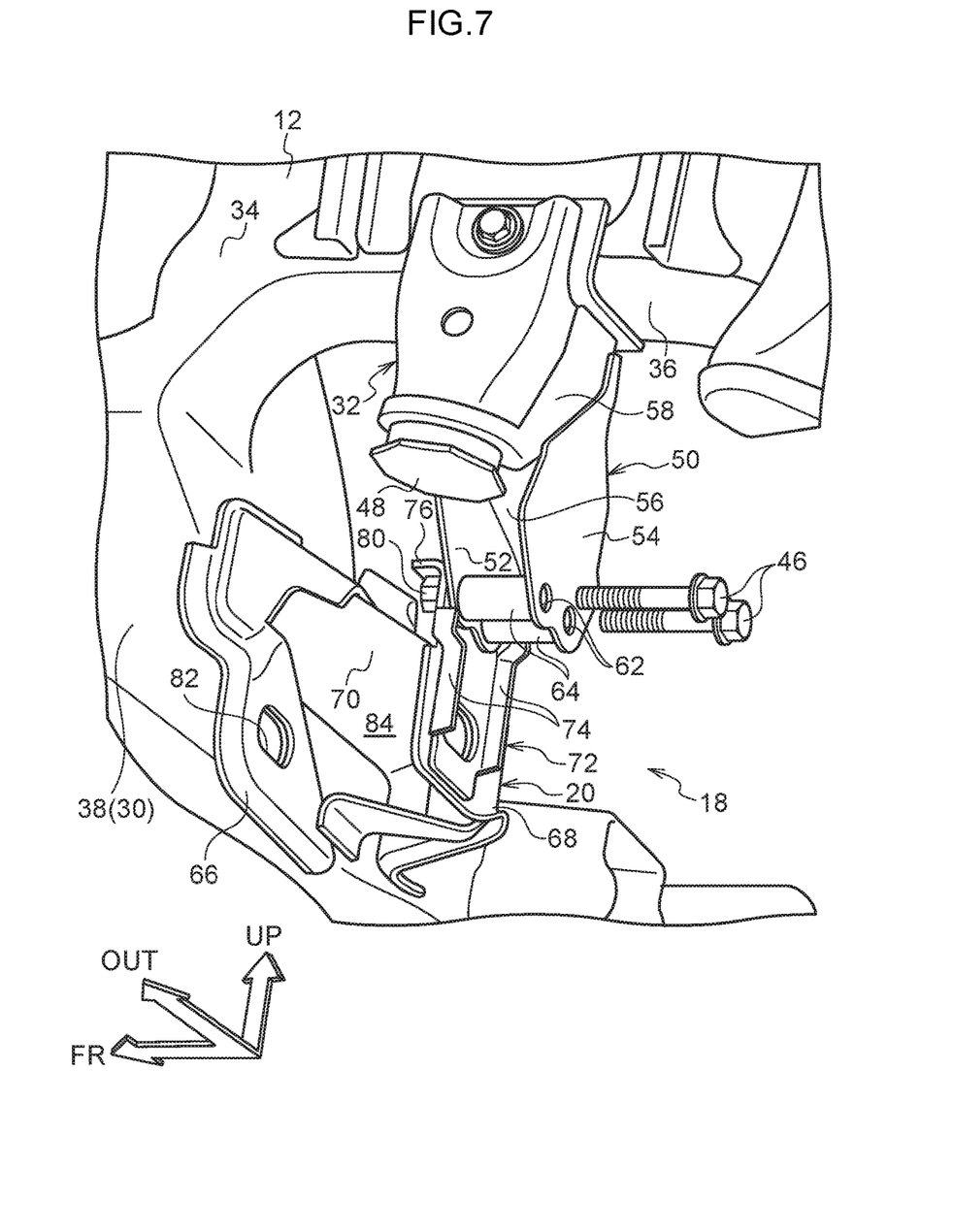
FIG. 7 is a side view illustrating relevant portions of a vehicle lower section structure according to an exemplary embodiment, as illustrated in a state viewed from the vehicle lower side toward the vehicle upper side.

As illustrated in FIG. 7, an inclined reinforcement section 50 is provided at each of the bound stopper brackets 32. The inclined reinforcement sections 50 each includes a front face 52 that is substantially plate-shaped with its plate thickness direction along the vehicle front-rear direction, a rear face 54 that faces the front face 52 is, similarly to the front face 52, substantially plate-shaped with its plate thickness direction along the vehicle front-rear direction, and an intermediate wall 56 that links the vehicle width direction inside end of the front face 52 and the vehicle width direction inside end of the rear face 54 together substantially along the vehicle front-rear direction so as to form a single body, in vehicle front view, the inclined reinforcement section 50 has a profile inclined toward a vehicle width direction inner side on progression toward a vehicle lower side. Note that the front face 52 of each of the inclined reinforcement sections 50 is coupled to a front face 55 (see FIG. 6) of the respective bound stopper bracket 32 from a vehicle front side. Moreover, the rear face 54 of each of the inclined reinforcement sections 50 is coupled to a rear face 58 of the respective bound stopper bracket 32 from a vehicle rear side. Moreover, the intermediate wall 56 of the inclined reinforcement section 50 is coupled to an inner side face of the bound stopper bracket 32 (see FIG. 8) from a vehicle width direction inner side.

Plural (two in the present exemplary embodiment) fastening holes 62 are formed at the front face 52 and the rear face 54 of each of the inclined reinforcement sections 50, so as to pierce through the front face 52 and the rear face 54 along their plate thickness directions at positions that overlap with each other in substantially a vehicle front view. Collars 64 formed in cylindrical shapes are clamped between the front face 52 and the rear face 54 of each of the inclined reinforcement sections 50. The collars 64 are provided at positions that overlap the plural fastening holes 62 in substantially a vehicle front view.

The lower arm brackets 20 are coupled to vehicle rear faces of the extension portions 38 of the cross-members 30. The lower arm brackets 20 each includes a bracket front face 66 and a bracket rear face 68 that serve as a lower arm support section. The bracket front face 66 is formed substantially plate-shaped with its plate thickness direction substantially along the vehicle front-rear direction. Moreover, the bracket rear face 68 faces the bracket front face 66, and, similarly to the bracket front face 66, is formed substantially plate-shaped with its plate thickness direction substantially along the vehicle front-rear direction. The bracket rear face 68 and the bracket front face 66 are linked together substantially along the vehicle front-rear direction by a bracket linking face 70 configured as a single body with the bracket rear face 68.

Figure 5:
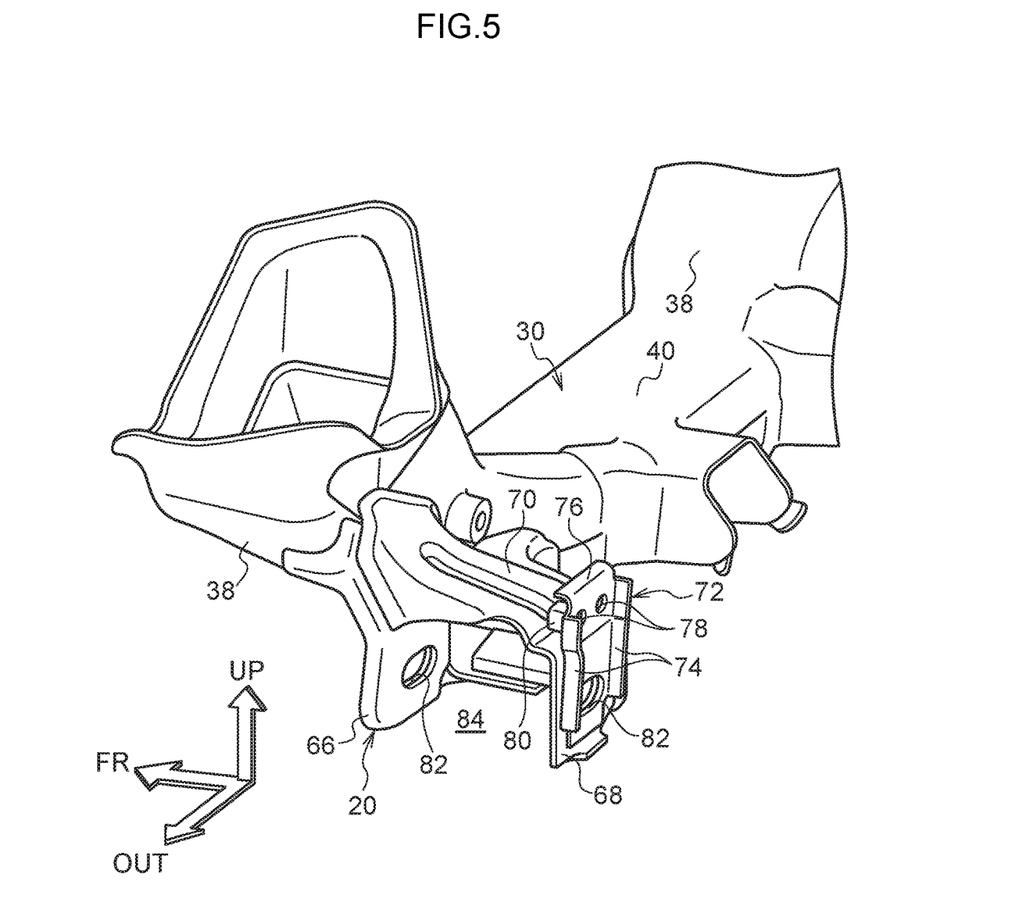
FIG. 5 is a perspective view illustrating a front lower extension section and a front-rear direction extension section in a vehicle lower section structure according to an exemplary embodiment, as illustrated in a state viewed from the vehicle rear side toward the vehicle front side.

As illustrated in FIG. 5, a contact reinforcement section 72 is attached to the bracket rear face 68 of each of the lower arm brackets 20. The contact reinforcement section 72 is formed substantially plate-shaped with its plate thickness direction substantially along the vehicle front-rear direction, and flanges 74 are formed extending from two vehicle width direction ends of the contact reinforcement section 72 toward a vehicle rear side (in other words, along the plate thickness direction of the contact reinforcement section 72). A flange 76 is formed at an upper end of the contact reinforcement section 72 and extends toward a vehicle front side. The contact reinforcement section 72 is configured such that a range from substantially the vehicle vertical direction center of the contact reinforcement section 72 to the vehicle lower side thereof makes contact with the bracket rear face 68 of the lower arm bracket 20, and such that a range from substantially the vehicle vertical direction center of the contact reinforcement section 72 to the vehicle upper side thereof does not make contact with the bracket rear face 68, and projects to a vehicle upper side of the bracket rear face 68. Fastening holes 78 are formed at locations where the contact reinforcement section 72 projects beyond the bracket rear face 68. The fastening holes 78 are formed so as to pierce through the plate thickness direction of the contact reinforcement section 72 at positions aligned with the fastening holes 62 of the inclined reinforcement section 50 in the respective bound stopper bracket 32. Nuts 80 are attached to the vehicle front side face of the contact reinforcement section 72 at positions corresponding to each of the fastening boles 78. As illustrated in FIG. 7, fasteners 46 are inserted, from the vehicle rear side, through the fastening holes 62 and the collars 64 of the inclined reinforcement sections 50 and through the fastening holes 78 of the contact reinforcement section 72 (see FIG. 5). The fasteners 46 are screwed into the nuts 80 of the contact reinforcement section 72 (see FIG. 6).

A lower arm fastening hole 82 is formed through the bracket front face 66 and the bracket rear face 68 of each of the lower arm brackets 20 and through each of the contact reinforcement sections 72, with the lower arm fastening holes 82 piercing through in the plate thickness directions of the bracket front face 66, the bracket rear face 68, and the contact reinforcement sections 72 at substantially the same positions as each other in a vehicle front view. The lower arms 22 are rendered capable of moving in the vehicle vertical direction about respective one end portions of the lower arms 22, as indicated by the arrows in FIG. 8A and FIG. 8B, by inserting a portion at the one end of each of the lower arms 22, which are formed in substantially U-shapes (substantially bifurcated shapes) open toward a vehicle width direction inner side in vehicle plan view, into a lower arm housing section 84 provided between the bracket front face 66 and the bracket rear face 68, and inserting a fastener 86 through the lower arm fastening holes 82 and through the one end portion of the lower arm 22 so as to pivotally support the one end portion of the lower arm 22. Note that the other ends of the lower anus 22 (not illustrated in the drawings) are supported by lower arm brackets 90 on a front cross-member 60 (see FIG. 4) so as to be pivotable in the vehicle vertical direction. Moreover, a lower end of a shock absorber 94 of each of the front suspensions 26 is rotatably fastened to vehicle width direction outer side of the respective lower arm 22, and movement of the lower arms 22 is damped thereby. Moreover, each of the lower arm housing sections 84, and hence, the bracket front faces 66 and the bracket rear faces 68, is disposed at a vehicle lower side of a location where the respective inclined reinforcement section 50 is fastened to the respective lower arm bracket 20.

Assembly Sequence to Side Rails

Figure 4:
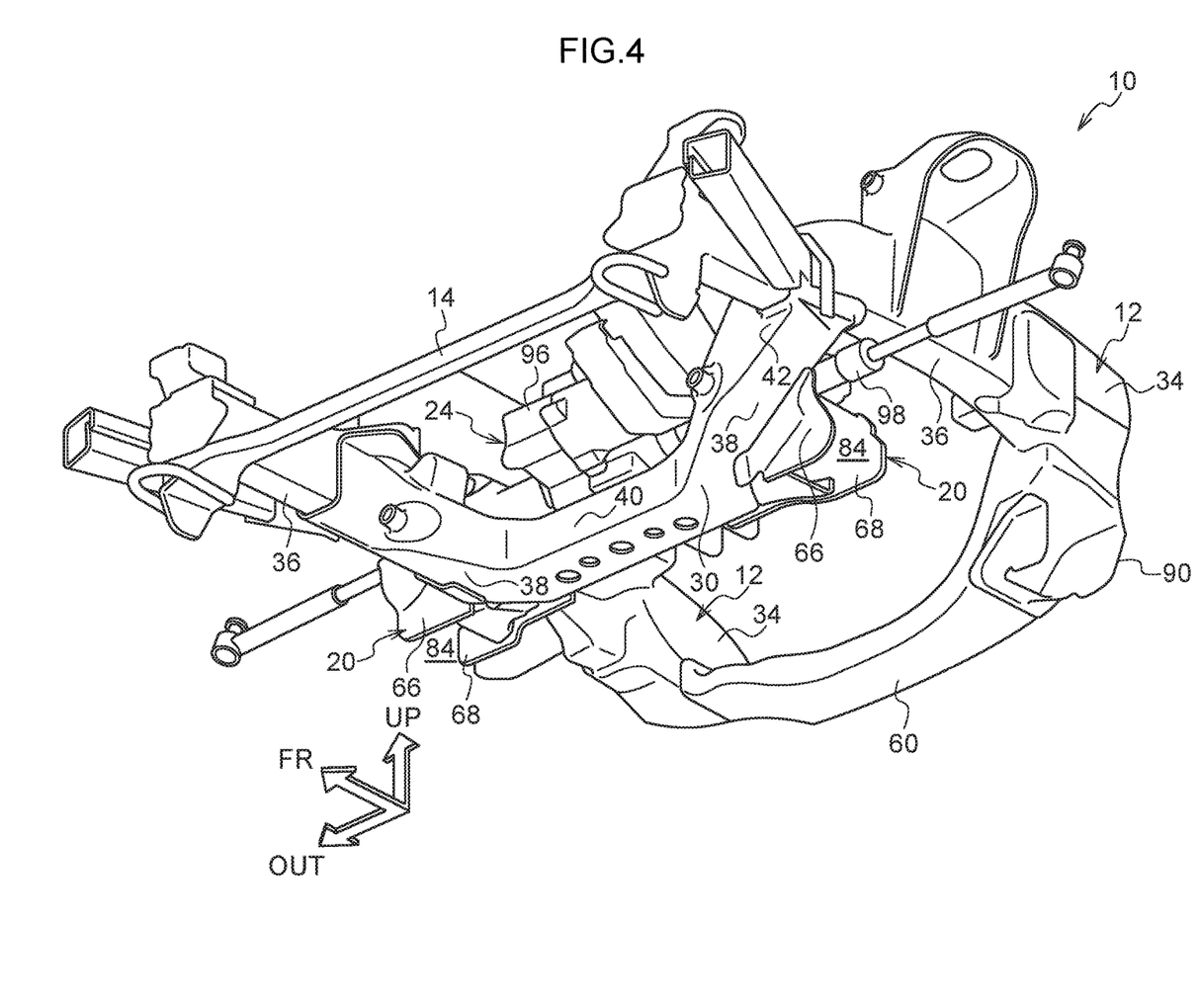
FIG. 4 is a perspective view illustrating part of a vehicle lower section structure according to an exemplary embodiment, as illustrated in a state viewed from the vehicle lower side toward the vehicle upper side.

As illustrated in FIG. 1, the steering gear box 24 is disposed between the cross-members 30 and the bound stopper brackets 32 in the vehicle front-rear direction. The steering gear box 24 is configured, for example, by an electrical power steering unit, and includes a motor module 96 at a substantially central location in the vehicle width direction, and a steering rod 98 that extends in the vehicle width direction. The steering rod 98 passes between the cross-members 30 and the bound stopper bracket 32 and is rotatably fastened to each of the steering knuckles 28. When attaching the steering gear box 24 to the vehicle 10, the steering rod 98 is installed between the side rails 12 and the lower arm brackets 20 in a state in which the cross-members 30, to which the lower arm brackets 20 have been pre-coupled, are already attached to the side rails 12, as illustrated in FIG. 4. Namely, the steering rod 98 is installed from a vehicle rear side toward a vehicle front side. After the steering gear box 24 has been attached to the vehicle 10, the steering gear box 24 is then disposed between the cross-members 30 and the bound stopper brackets 32 by attaching the bound stopper brackets 32 to the side rails 12.

Operation and Advantageous Effects

The operation and advantageous effects of the present exemplary embodiment will now be described.

In the present exemplary embodiment, as illustrated in FIG. 1, the lower extension sections 18 are each joined to the left or right pair of side rails 12 that extend along the vehicle front-rear direction. As illustrated in FIG. 2, each of the lower extension sections 18 includes the cross-member 30 that is disposed at the vehicle front side region of the side rails 12 and extends toward the vehicle lower side, and the bound stopper bracket 32 that is disposed at the vehicle rear side of the cross-member 30 and that extends toward the vehicle lower side. Moreover, the lower arm brackets 20 are provided so as to bridge along the vehicle front-rear direction between the cross-members 30 and the bound stopper brackets 32. The bracket front face 66 and the bracket rear face 68, to which the respective lower arm 22 is attached, are provided at each of the lower arm brackets 20. The lower arm brackets 20 are joined to the bound stopper brackets 32 at the vehicle rear side of the respective bracket front face 66 and bracket rear face 68. Load input from the lower arms 22 during vehicle travel is input mainly toward the vehicle rear side. This load can be transmitted to the side rails 12 through the bound stopper brackets 32 positioned at the vehicle rear side with respect to the bracket front face 66 and the bracket rear face 68. The load input from the lower arms 22 can thereby be transmitted efficiently to the vehicle body framework.

Moreover, due to the bound stopper bracket 32 and the lower arm bracket 20 being configured by discrete members, an improvement in handling can be achieved during manufacture when attaching the cross-members 30, to which the lower arm brackets 20 have been coupled, and the bound stopper brackets 32 to the side rails 12. This enables the ease of production to be improved during manufacture.

Moreover, as illustrated in FIG. 1, the steering gear box 24 is provided between the cross-members 30 and the bound stopper brackets 32. When the steering gear box 24 is being attached to the vehicle, the attachment operation can be facilitated by assembling the steering gear box 24 to the vehicle 10 prior to attaching either the cross-members 30 or the bound stopper brackets 32 to the side rails 12. This enables the ease of production during manufacture to be improved.

Moreover, as illustrated in FIG. 6, the bound stoppers 48 are provided at the bound stopper brackets 32 so as to be capable of contacting the lower arms 22 when the lower arms 22 have moved toward a vehicle upper side. Thus even in cases in which the lower arms 22 have moved toward the vehicle upper side due to input from the road surface, additional movement of the lower arms 22 is limited by the bound stopper brackets 32, enabling impinging of the wheels or the like on the vehicle body to be decreased or prevented. Namely, the bound stopper brackets 32 that are part of the configuration members for attaching the lower arms 22 to the vehicle body are able to limit the movement of the lower arms 22. This enables the number of components to be reduced.

Figure 8A:
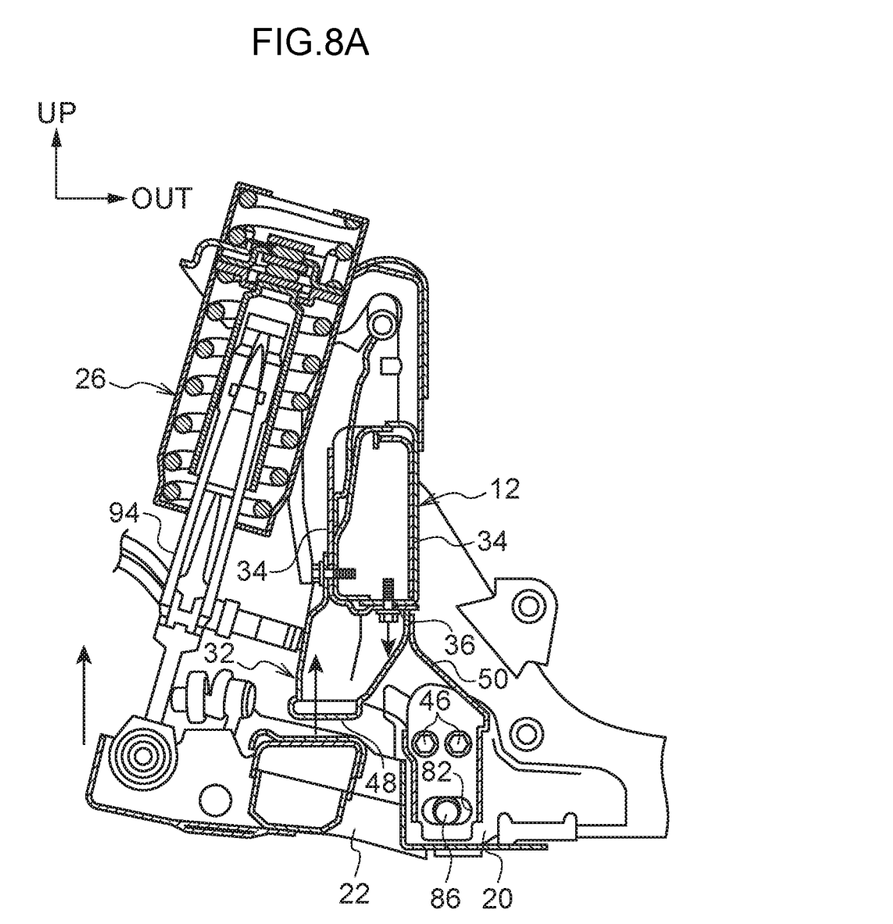
FIG. 8A is a cross-section illustrating a state sectioned along line A-A of FIG. 1.
Figure 8B:
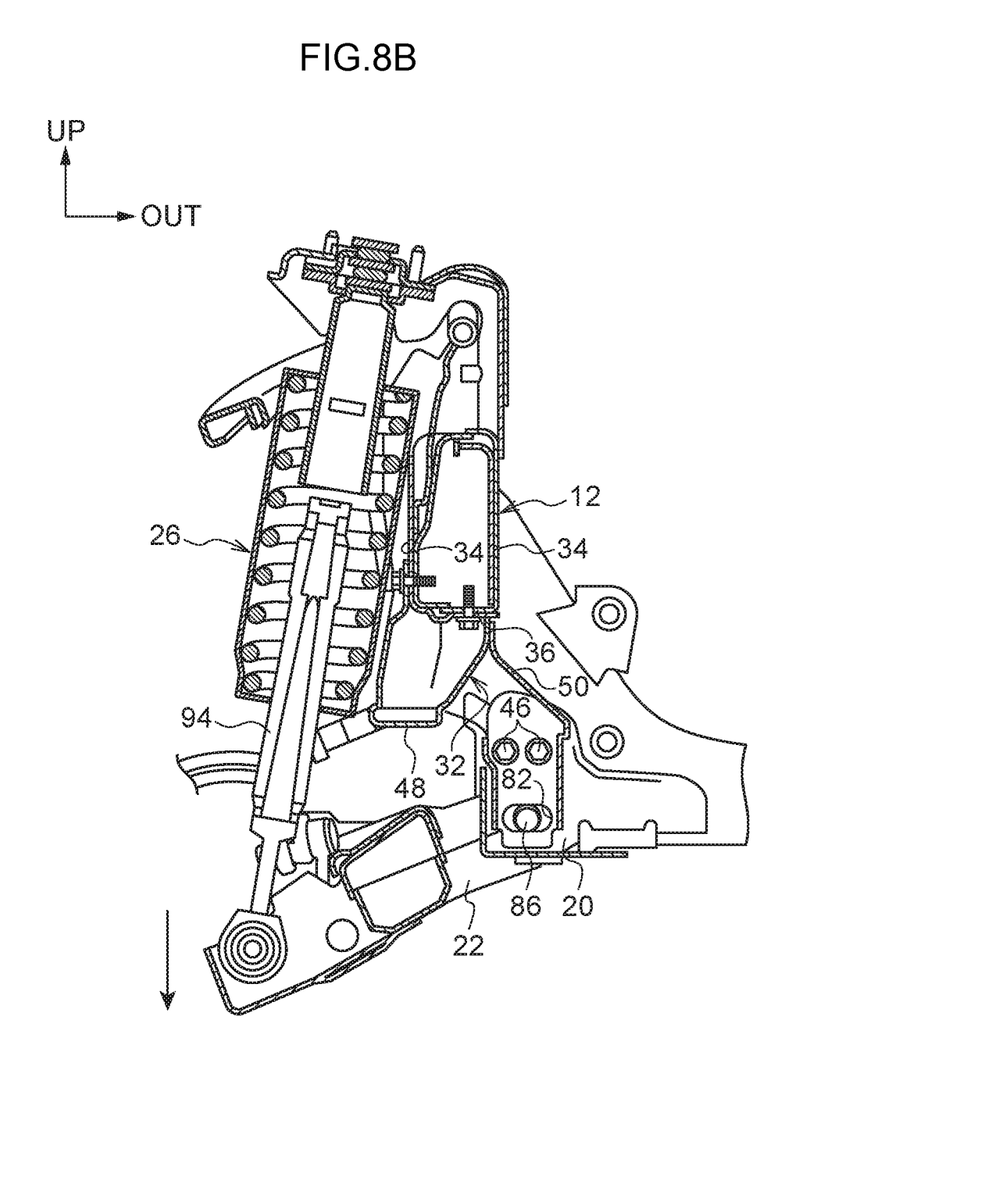
FIG. 8B is a cross-section illustrating a state in which a lower arm has moved toward the vehicle lower side with respect to the state in FIG. 8A.

Moreover, as illustrated in FIG. 8A and FIG. 8B, the bound stoppers 48 are formed at the vehicle lower side of the bound stopper brackets 32, namely at the vehicle lower side of the side rails 12 in a vehicle front view. Thus when the lower arms 22 have moved toward the vehicle upper side about the lower arm housing sections 84, further movement of the lower arms 22 is limited by contact with the bound stopper brackets 32, enabling load input to the bound stopper brackets 32 from the lower arras 22 when this occurs to be efficiently transmitted to the side rails 12.

Furthermore, the inclined reinforcement sections 50 are formed at the bound stopper brackets 32, with the inclined reinforcement sections 50 inclined toward the vehicle width direction inner side on progression toward the vehicle lower side and joined to the lower arm brackets 20. Moreover, the lower arm housing sections 84 of the lower arm brackets 20, and hence, the bracket front faces 66 and the bracket rear faces 68, are disposed at the vehicle lower side of locations where the inclined reinforcement sections 50 and the lower arm brackets 20 are joined together. Namely, the lower arm housing section 84, and hence, the bracket front faces 66 and the bracket rear faces 68, are disposed at the vehicle width direction inner side of the side rails 12. The bound stoppers 48 of the bound stopper brackets 32 attached to the side rails 12 can accordingly be disposed at positions separated in the vehicle width direction from the lower arm housing sections 84, which are the pivot centers of the lower arms 22. Due to the principle of leverage, the load from the lower arms 22 borne by the bound stoppers 48, and hence, by the bound stopper brackets 32, can thereby be made smaller than in a configuration in which the bound stoppers 48 are disposed in the vicinity of the lower arm housing sections 84, enabling the bound stopper brackets 32 to be made more compact. This enables a reduction in weight of the vehicle 10 to be achieved.

Moreover, disposing the lower arm housing sections 84 (the bracket front faces 66 and the bracket rear faces 68) at the vehicle width direction inner side of the side rails 12 enables the lower arm housing sections 84 (the bracket front faces 66 and the bracket rear faces 68) to be suppressed from impinging on locations of the lower arms 22 which extend substantially in vehicle front-rear direction.

Moreover, as illustrated in FIG. 7, the inclined reinforcement sections 50 each includes the front face 52, the rear face 54 facing the front face 52, and the collars 64 provided between the front face 52 and the rear face 54. The inclined reinforcement sections 50 are each also fastened to the respective lower arm bracket 20 through the fasteners 46 that are inserted through the front face 52, the rear face 54, and the collars 64. The load input from the lower arm 22 is accordingly transmitted to the bound stopper bracket 32 through the lower arm bracket 20. However, when this occurs, in each of the inclined reinforcement sections 50 of the bound stopper brackets 32, the load can be transmitted to both the front face 52 and the rear face 54 by the collars 64 without being unevenly transmitted to either the front face 52 or the rear face 54.

Moreover, as illustrated in FIG. 5, each of the contact reinforcement sections 72, that contacts a rear end portion of the respective lower arm bracket 20, is attached to the inclined reinforcement section 50 of the respective bound stopper bracket 32. Note that the contact reinforcement sections 72 are each formed in a substantially plate-shape having a plate thickness direction substantially along the vehicle front-rear direction and are each formed with the flanges 74 extending in the plate thickness direction. The load input from the lower arms 22 can be transmitted to the bound stopper brackets 32 through the lower arm brackets 20. When this occurs, the load can be transmitted efficiently to the side rails 12 due to the load being transmitted through the contact reinforcement sections 72 that have improved bending rigidity due to being formed with the flanges 74. These features enable the load input from the lower arms 22 to be transmitted efficiently through the lower arm brackets, the contact reinforcement sections 72, and the bound stopper brackets 32 to the side rails 12, which configure the vehicle body framework.

Moreover, the inclined reinforcement sections 50 are formed in substantially plate-shape. This enables the space required between the lower arm brackets 20 and the bound stopper brackets 32 to be minimized. An improvement in space reduction can thereby be achieved.

Furthermore, as illustrated in FIG. 2, each of the inclined portions 44, which is inclined toward the vehicle rear side on progression toward the vehicle lower side, is formed at the respective vehicle front faces 42 of the cross-members 30. Thus, when an obstacle such as a rock hits the cross-member 30 during vehicle travel, the obstacle is more readily allowed to escape toward the vehicle rear side by the inclined portion 44, enabling the impact force input to the cross-member 30 to be reduced.

Figure 3:
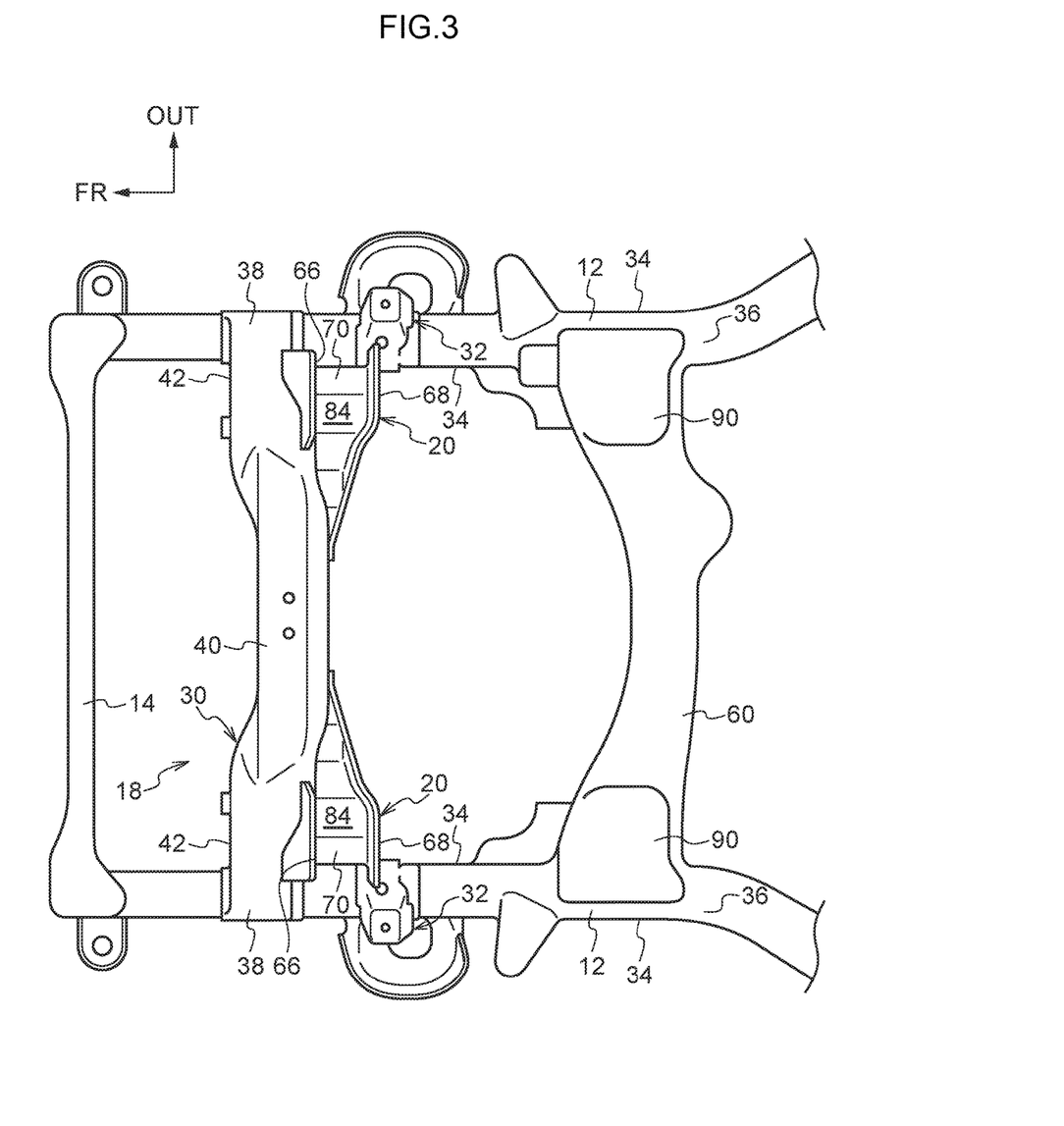
FIG. 3 is a bottom view illustrating part of a vehicle lower section structure according to an exemplary embodiment, as illustrated in a state viewed from the vehicle lower side.

Moreover, as illustrated in FIG. 3, the cross-members 30 that are each provided at the left and right pair of side rails 12 are linked together as a single unit in the vehicle width direction. Namely, the cross-members 30 are configured so as to readily distribute load to the bound stopper brackets 32. Thus deformation and damage can be suppressed even in cases in which an obstacle hits either of the cross-member 30 during vehicle travel. This enables damage to the vehicle 10 to be reduced when traveling on a rough road or the like.

Note that although in the above exemplary embodiment a configuration is adopted in which the steering gear box 24 is provided between the cross-members 30 and the bound stopper brackets 32, there is no limitation thereto. A configuration may be adopted in which another component such as a stabilizer or the like is provided together with the steering gear box 24, or a configuration may be adopted in which another component is provided alone between the cross-members 30 and the bound stopper brackets 32.

Moreover, although the inclined reinforcement sections 50 of the bound stopper brackets 32 are joined to the lower arm brackets 20 through the respective contact reinforcement sections 72, there is no limitation thereto. A configuration may be adopted that employs direct joining therebetween, instead of through the contact reinforcement sections 72.

Moreover, although the lower arm housing sections 84 (the bracket front faces 66 and the bracket rear faces 68) of the lower arm brackets 20 are disposed at the vehicle lower side of locations where the inclined reinforcement sections 50 and the lower arm brackets 20 are joined together, there is no limitation thereto, and they may be disposed at other locations. Furthermore, although the bound stoppers 48 are provided at the vehicle lower side of the side rails 12 in a vehicle front view, there is no limitation thereto. A configuration may be adopted in which the bound stoppers 48 are provided at the vehicle width direction outer side or the vehicle width direction inner side of the side rails 12.

Furthermore, although in the present exemplary embodiment application is made to the vehicle 10 having a ladder frame structure, there is no limitation thereto. A configuration may be adopted in which the lower extension section 18 is provided at front side members or the like of a vehicle having a monocoque structure or the like.

Although the present disclosure has been described above by way of exemplary embodiments, the present disclosure is not limited thereto, and obviously various modifications may be implemented other than those described above within a range not departing from the scope of the present disclosure.

What is claimed is:

1. A vehicle lower section structure comprising:
   a left and right pair of vehicle body frame members extending substantially along a vehicle front-rear direction;
   a lower extension section joined to each of the left and right pair or vehicle body frame members, the lower extension section including:
   a front lower extension section disposed at a predetermined position in the vehicle front-rear direction with respect to the vehicle body frame members and extending toward a vehicle lower side, and
   a rear lower extension section disposed at a vehicle rear side of the front lower extension section and extending toward the vehicle lower side; and
   a front-rear direction extension section that is disposed so as to bridge along the vehicle front-rear direction between the front lower extension section and the rear lower extension section, the front-rear direction extension section being provided with a lower arm support section that a lower arm is configured to be attached to so as to be pivotable in substantially a vehicle vertical direction, and the front-rear direction extension section being joined to the rear lower extension section at the vehicle rear side of the lower arm support section.

2. The vehicle lower section structure of claim 1, wherein the rear lower extension section and the front-rear direction extension section are configured by discrete members.

3. The vehicle lower section structure of claim 2, wherein at least one of a steering member or a stabilizer is configured to be disposed between the front lower extension section and the rear lower extension section.

4. The vehicle lower section structure of claim 1, wherein a hound stopper is provided at the rear lower extension section so as to be capable of contacting the lower arm when the lower arm has pivoted toward substantially a vehicle upper side.

5. The vehicle lower section structure of claim 4, wherein:
   an inclined reinforcement section is formed at the rear lower extension section, the inclined reinforcement section being inclined toward a vehicle width direction inner side on progression toward the vehicle lower side and being joined to the front-rear direction extension section; and
   the lower arm support sect on of the front-rear direction extension section is disposed at the vehicle lower side of a location where the inclined reinforcement section and the front-rear direction extension section are joined together.

6. The vehicle lower section structure of claim 5, wherein:
   the inclined reinforcement section includes a front face, a rear face facing the front face, and a collar provided between the front face and the rear face; and
   the inclined reinforcement section is fastened to the front-rear direction extension section through a fastener that is inserted through the front face, the rear face, and the collar.

7. The vehicle lower section structure of claim 5, wherein:
   a contact reinforcement section that contacts a rear end portion of the front-rear direction extension section is attached to the inclined reinforcement section of the rear lower extension section; and
   the contact reinforcement section is substantially plate-shaped, with a plate thickness direction thereof being substantially along the vehicle front-rear direction, and the contact reinforcement section is formed with a flange extending along the plate thickness direction.

8. The vehicle lower section structure of claim 1, wherein an inclined portion is formed at a vehicle front side face of the front lower extension section, the inclined portion being inclined toward the vehicle rear side on progression toward the vehicle lower side.

9. The vehicle lower section structure of claim 1, wherein the front lower extension section is respectively provided at the left and right pair of vehicle body frame members, and the front lower extension sections are linked together to each other in a vehicle width direction so as to form an integral body.

* * * * *

UNITED STATES PATENT AND TRADEMARK OFFICE
CERTIFICATE OF CORRECTION

PATENT NO. : 10,239,558 B2
APPLICATION NO. : 15/863201
DATED : March 26, 2019
INVENTOR(S) : Ryuichi Okumoto It is certified that error appears in the above-identified patent and that said Letters Patent is hereby corrected as shown below:

On the Title Page

Item (57), Abstract, Line 13, after "pivotably" insert --in--.

In the Specification

In Column 2, Line 52, after "steering", delete ",".

In Column 3, Line 8, after "wherein", delete ";" and insert --:--, therefor.

In Column 3, Line 42, after "wherein", delete ";" and insert --:--, therefor.

In Column 5, Line 66, delete "front-roar" and insert --front-rear--, therefor.

In Column 5, Line 67, after "direction", delete "," and insert --.--, therefor.

In Column 6, Line 20, after "side", delete "wails" and insert --walls--, therefor.

In Column 6, Line 57, after "body", delete "," and insert --.--, therefor.

In Column 6, Line 57, before "vehicle", delete "in" and insert --In--, therefor.

In Column 7, Line 59, delete "boles" and insert --holes--, therefor.

In Column 8, Line 19, after "lower", delete "anus" and insert --arms--, therefor.

In Column 9, Line 56, after "lower", delete "arras" and insert --arms--, therefor.

Signed and Sealed this
Seventh Day of May, 2019

Andrei Iancu
*Director of the United States Patent and Trademark Office*